United States Patent
Wei

(10) Patent No.: US 10,779,162 B1
(45) Date of Patent: Sep. 15, 2020

(54) WIRELESS NETWORK DEVICE PROVISIONING

(71) Applicant: Amazon Technologies, Inc., Seattle, WA (US)

(72) Inventor: QingYun Wei, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 299 days.

(21) Appl. No.: 15/810,899

(22) Filed: Nov. 13, 2017

Related U.S. Application Data

(60) Provisional application No. 62/555,830, filed on Sep. 8, 2017, provisional application No. 62/555,814, filed on Sep. 8, 2017.

(51) Int. Cl.
*H04W 8/00* (2009.01)
*H04W 12/08* (2009.01)
*H04W 12/06* (2009.01)
*H04W 88/04* (2009.01)
*H04L 29/06* (2006.01)
*H04W 76/14* (2018.01)
*H04W 12/04* (2009.01)

(52) U.S. Cl.
CPC ......... *H04W 12/06* (2013.01); *H04L 63/0823* (2013.01); *H04W 12/08* (2013.01); *H04W 76/14* (2018.02); *H04W 88/04* (2013.01); *H04W 8/005* (2013.01); *H04W 12/04* (2013.01)

(58) Field of Classification Search
CPC ..... H04W 76/10; H04W 76/14; H04W 8/005; H04W 12/06; H04L 63/08; H04L 63/0823
See application file for complete search history.

(56) References Cited

U.S. PATENT DOCUMENTS

| | | | |
|---|---|---|---|
| 9,955,526 B1* | 4/2018 | Yu | H04L 67/12 |
| 2015/0146706 A1* | 5/2015 | Goluboff | H04W 76/10 370/338 |
| 2015/0382198 A1* | 12/2015 | Kashef | H04W 8/20 726/5 |
| 2016/0044037 A1* | 2/2016 | Lindheimer | H04W 12/08 726/4 |
| 2016/0111091 A1* | 4/2016 | Bakish | G10L 15/30 704/275 |
| 2016/0294828 A1* | 10/2016 | Zakaria | H04W 4/70 |
| 2017/0041083 A1* | 2/2017 | Kwon | H04B 11/00 |

(Continued)

*Primary Examiner* — Khang Do
(74) *Attorney, Agent, or Firm* — Pierce Atwood LLP

(57) ABSTRACT

A system and method establishes a communication connection between a first, potentially input-limited device and a network-access device through an intermediate second device that is connected to the network-access device. The first device broadcasts a discovery request and receives a response from the second device. A first communication connection is established between the first device and the second device. The first device transmits a digital certificate to be sent to a remote device, which may authenticate the first device therewith. Network-login information, such as a network name and network password, are received from the second device, with which the first device establishes the communication connection. The second device may be capable of processing spoken commands (for example, in connection with the remote device), thus allowing the first device to be connected to the network-access device using spoken commands.

20 Claims, 13 Drawing Sheets

(56) References Cited

U.S. PATENT DOCUMENTS

| | | | |
|---|---|---|---|
| 2017/0201850 A1* | 7/2017 | Raleigh | G06F 3/0482 |
| 2018/0034690 A1* | 2/2018 | Sivarajan | H04W 12/04 |
| 2018/0035248 A1* | 2/2018 | Soave | H04W 4/025 |
| 2018/0146367 A1* | 5/2018 | Altin | H04W 4/70 |
| 2018/0159958 A1* | 6/2018 | Olive | H04L 67/34 |
| 2018/0160252 A1* | 6/2018 | Olive | H04W 8/205 |
| 2018/0316658 A1* | 11/2018 | Bartlett | H04W 12/04071 |
| 2019/0058586 A1* | 2/2019 | Kumar | H04L 9/0861 |

* cited by examiner

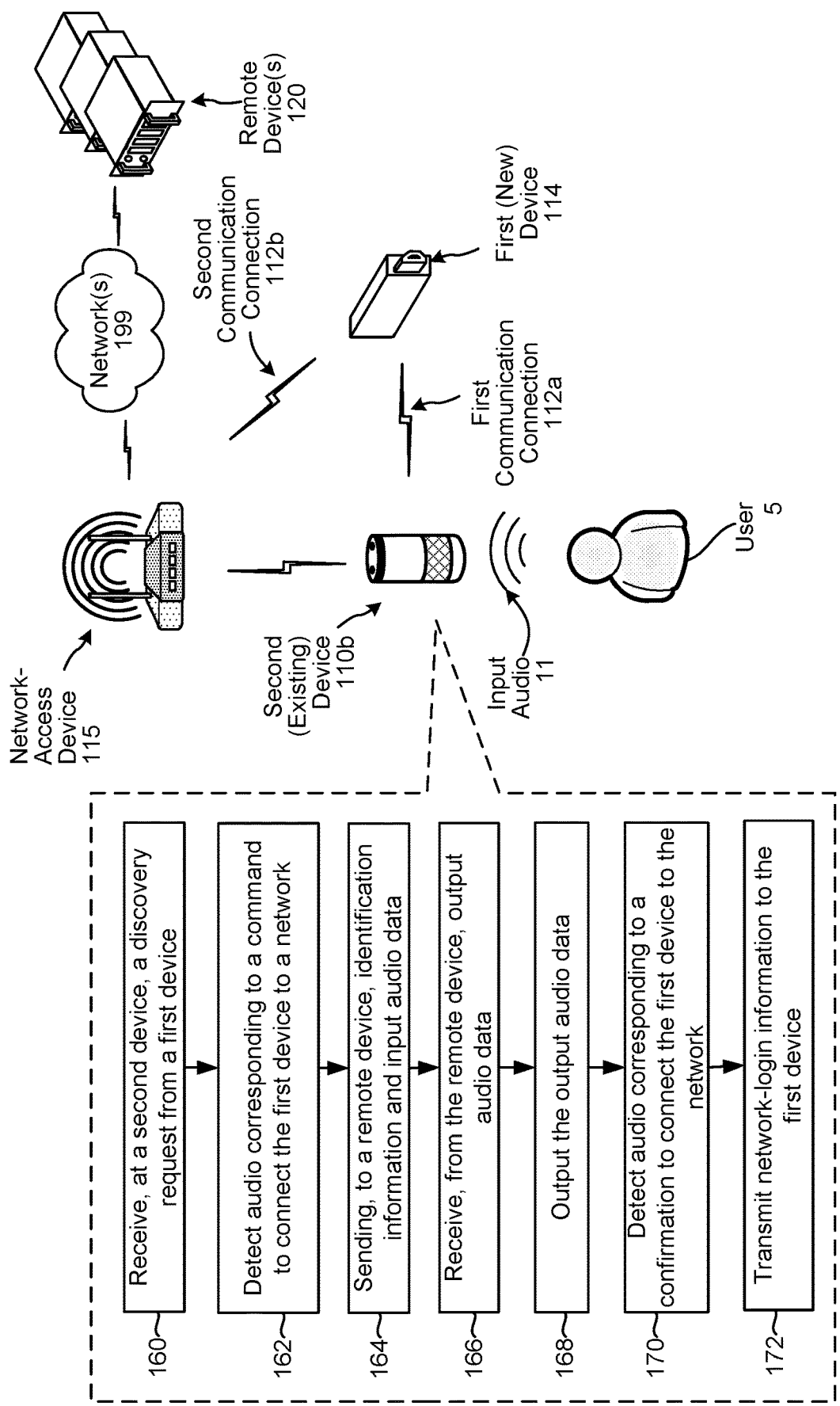

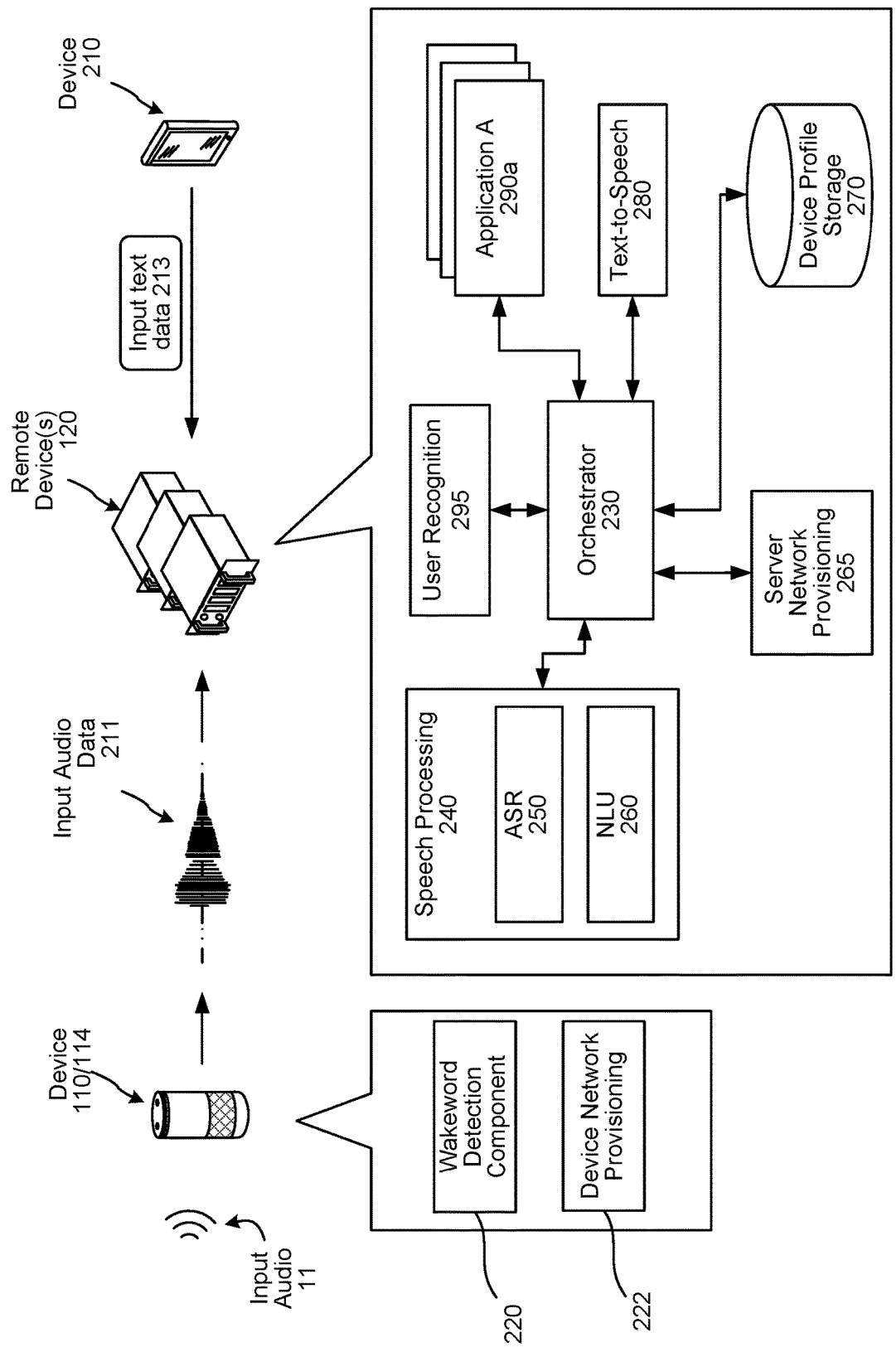

WIRELESS NETWORK DEVICE PROVISIONING

CROSS REFERENCE TO RELATED APPLICATION

This case claims priority to provisional U.S. Patent Application No. 62/555,830, entitled VOICE CONTROLLED AND CLOUD BASED WI-FI PROVISIONING filed on Sep. 8, 2017, in the name of QingYun Wei, and to provisional U.S. Patent Application No. 62/555,814, entitled VOICE CONTROLLED AND WPS-PBC ENHANCED WI-FI PROVISIONING METHOD filed on Sep. 8, 2017, in the names of Graham LeBlanc, et al., which are herein incorporated by reference in their entireties.

BACKGROUND

Consumer-electronics devices are capable of connecting to remote devices such as data servers over the Internet and retrieve data files on demand. Electronic devices come in a variety of forms, including "headless" or "input-limited" devices, which may not have certain input/output components such as a display, keyboard, touchscreen, or similar components.

Speech-recognition systems have progressed to the point at which humans can interact with computing devices using their voices. Such systems employ techniques to identify the words spoken by a human user based on the various qualities of received audio input. Speech recognition combined with natural-language understanding processing techniques enable speech-based user control of a computing device to perform tasks based on the user's spoken commands. The combination of speech recognition and natural-language understanding processing techniques is referred to herein as speech processing. Speech processing may also involve converting a user's speech into text data, which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1B illustrates a system configured to provision a device using a voice interface according to embodiments of the present disclosure.

FIG. 2 is a conceptual diagram of components of a device provisioning system according to embodiments of the present disclosure.

DETAILED DESCRIPTION

Figure 1A:
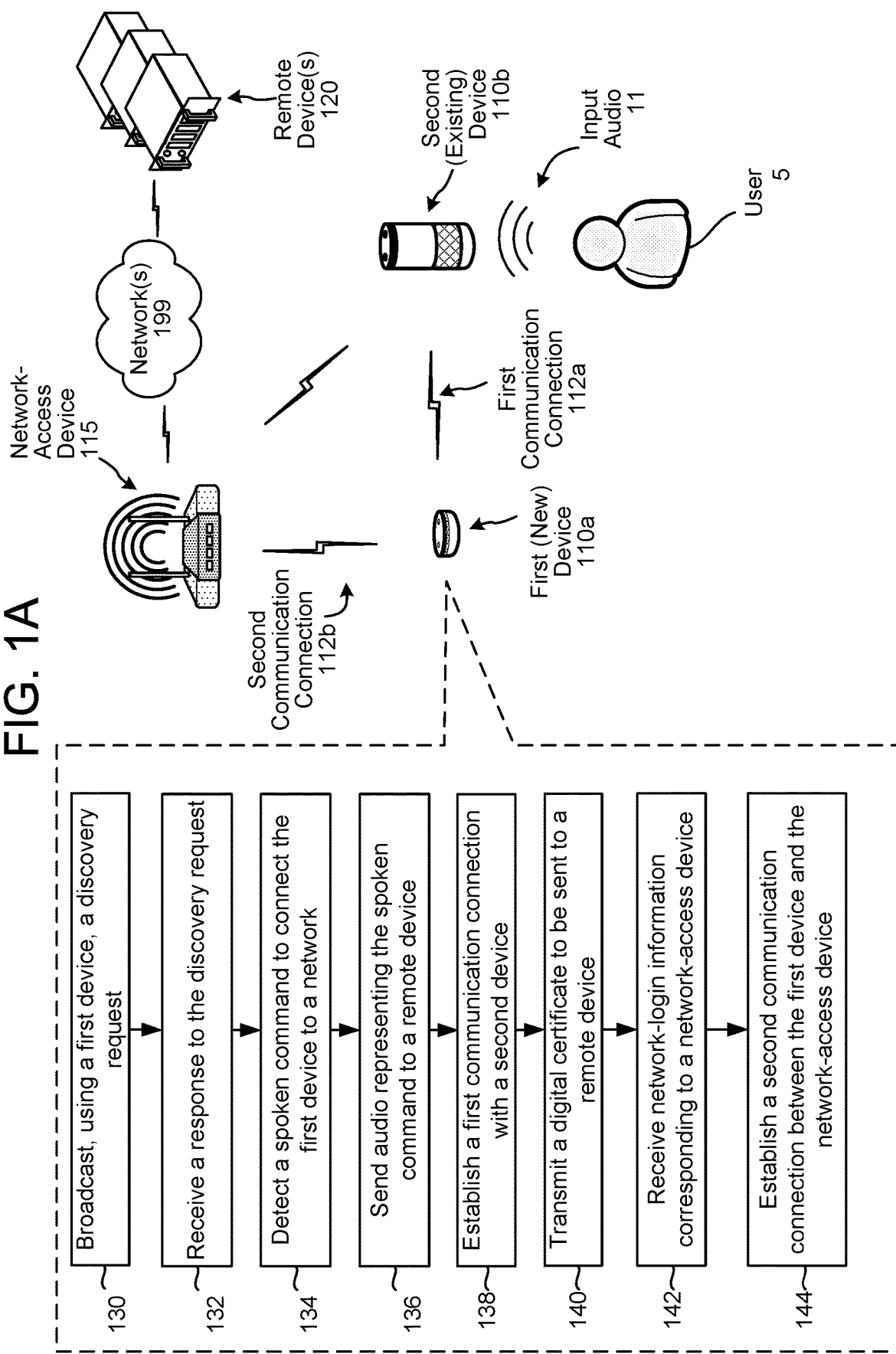
FIG. 1A illustrates a system configured to provision a device having a digital certificate according to embodiments of the present disclosure.

Certain electronic devices, sometimes referred to as "headless" or "input-limited" devices, may have limited user-interface capabilities for entry of information. For example, an input-limited device may feature a voice-based input/output interface for control using speech but may lack an alphanumeric keyboard or touchscreen that supports input of text characters and may even lack a wired or wireless port to connect those devices. Other input-limited devices may include a touchscreen, but entry of letters, numbers, and special characters on the touchscreen may be difficult and prone to errors. Entry of text or other input characters is, however, sometimes required, such as when a user of an input-limited device must enter login information (e.g., a representation of a network name and/or network password, which may include plain-text and/or encrypted versions of the network name and/or network password) to provision the device to join a secure network, such as a wireless network provided by a wireless-access point (e.g., a wireless local-area network (WLAN) access point, such as a WiFi network-access point). Further input, such as a user name and user password, may be required to authenticate the device to a remote device, such as an e-commerce web site.

Exemplary input-limited devices include smart speakers, wireless access points, smart televisions, wearable devices, voice-enabled appliances, voice-enabled thermostats, cellular telephones, tablet computers, or other such devices. The present disclosure is not, however, limited to only input-limited devices, and any devices, even ones not input-limited, are within the scope of the present disclosure.

Input-limited devices, such as touchscreen-based and/or speech-controlled devices, or other devices may utilize automatic speech recognition, natural language understanding, and/or text-to-speech techniques. Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. Text-to-speech (TTS) is a field of computer science, artificial intelligence, and linguistics concerned with enabling computers to output synthesized speech. ASR, NLU, and TTS may be used together as part of a speech processing system.

ASR and NLU may be computationally expensive. That is, significant computing resources may be needed to process ASR and NLU processing within a reasonable time frame, and a local device may lack these resources. Because of this lack, a distributed computing environment may be used when performing speech processing. An example of such a distributed environment may involve a local device connected via a network to a remote device that possesses greater computing resources. The local device, which may be an input-limited device, may have one or more microphones configured to capture sounds from a user speaking and circuitry configured to convert those sounds into an audio signal. The local device may send data corresponding to the audio signal to the remote device for further processing, such as ASR and/or NLU processing, to convert the audio signal into a command or other data. The command may then be executed by, or the data may be used by, the remote device, the input-limited device, and/or another device.

Such a distributed system, however, may present difficulties for input-limited devices. Because many such devices rely on one or more network-connected remote devices (such as group of cloud servers) to perform ASR and/or NLU to operate, the input-limited device may effectively be inoperable (save for a few functions such as setup, etc.) until network access is enabled for the device. Unless the input-limited device is able to connect to the network through another device (e.g., connecting to the Internet by relaying data through a smart phone, which itself may have access to the Internet through an access point), the input-limited device will be unable to access remote data. If a local network provided by an access point is a secure network that requires a network password or other authentication, it may be difficult to connect the input-limited device to the network. Even if the local network is insecure, it may still be difficult to enter a user name and user password necessary to authenticate the device with a remote device.

One solution to this problem is to connect the input-limited device to a more input-capable device (such as a companion phone, tablet, etc.) and provide input therewith. This solution may not be desirable, however, because using another device to connect the input-limited device to a network may be burdensome for a user, particularly a user that is not comfortable with configuring network access. Entering the network name, network password, user name, and/or user password via the voice interface may be similarly undesirable because the process may be difficult, time-consuming, and/or prone to errors. Existing attempts at providing solutions, such as Wi-Fi protected setup (WPS), are undesirable as inconvenient (at least because they require physical access to devices and that the devices are in close proximity), insecure (at least because anyone having a WPS-enabled device can join any network if and when an access point's WPS mode is enabled) and/or non-scalable (at least because an access point WPS will cease adding clients if too many attempt to join too quickly).

Offered is a system and method for provisioning a device, including but not limited to an input-limited device, to join a network and/or authenticating the device with a remote device. Although some of the description below may vary, a device being newly provisioned to communicate using a wireless network may be referred to as a first device, while a device that is already provisioned to the network (and may be used to help provision the new device) may be referred to as a second device or existing device. In some embodiments of the present disclosure, a first device includes data, such as a digital certificate, that identifies the device. When the first device is initially turned on but is not provisioned and/or authenticated (e.g., before it has been given credentials to access a particular wireless network), it broadcasts a discovery request (discussed below) and waits for a response. A second, already provisioned device then receives the discovery request and responds, thus leading to the first device and the second device establishing a communication connection. The digital certificate of the first device is sent to the second device and verified (potentially by a remote device which is sent the digital certificate by the second device). Once the first device is verified, the second device transmits network-login information to the first device, which may then join the network. In some embodiments, the second device receives device identification information from the first device, such as model information of the first device; the second device may then interact with a user (for example, using a spoken command voice interface) to confirm addition of the first device to the network. The offered system and method thus provide a simpler, less time-consuming, and more secure way to provision a new device.

As the terms are used herein, provisioning includes identifying a network, such as a Wi-Fi network, using a representation of a network name, such as a plain-text or encrypted service-set identifier (SSID), and providing a representation of a network password, which may be a plain-text or encrypted network password, to thereby establish a communications connection between a device and a network-access device, such as a wireless access point (AP). The representations of the network name, network password, and/or other information (such as a network authentication method) may be collectively referred to as network-login information. Authentication includes sending or otherwise providing a user name and/or user password—referred to as user-login information—to a remote device to thereby authenticate the device with the remote device. Other information to access the network may also be exchanged.

FIG. 1A illustrates a system for provisioning and/or authenticating a first, new, device 110a into a network using a digital certificate stored on the device 110a. The first device 110a may be an input-limited device. Although the figures and discussion illustrate certain operational steps of the system in a particular order, the steps described may be performed in a different order (as well as certain steps removed or added) without departing from the intent of the disclosure. Devices (110a/110b), local to a user 5, one or more remote device(s) 120, which may be cloud or other types of server(s), and/or one or more application servers (not illustrated) may communicate across one or more networks 199. The devices 110a/110b may communicate with a network-access device 115, which may be, for example, a wireless access point (AP) that is also local to a user 5 or otherwise within wireless communication range of first device 110a and second device 110b.

In some embodiments, when the first device 110a is powered on, it is not provisioned to the network-access device 115. The first device 110a may be in this state because it is a new, recently-purchased device, because it was recently reset to factory settings, because it was recently brought to the location of the network-access device 115, or for any other such reason. Once powered on, however, a device network provisioning component 222 (as shown in FIG. 2 and discussed below) of the first device 110a causes the first device 110a to broadcast (130) a discovery request.

The discovery request may be in a format that conforms with expected or standard requests to wirelessly connect devices or may be in a custom format that includes information different from expected or standard requests. The discovery request may include a sequence of bits that identifies the nature of the request to other devices (e.g., a header), other bits that include information (e.g., a payload), or any other bits. In some embodiments, the discovery request is a Wi-Fi discovery request and includes IEEE 802.11 data, which may include data formatted in frames, which may be management frames. The discovery request may include information associated with the first device 110a, such as but not limited to a configuration status, device identification information, user account information, and/or other information. The configuration status may include a Boolean value indicating whether the first device 110a has been provisioned with the network-access device 115. The device identification information may include alphanumeric characters identifying the first device 110a and may include a device type, model name, device name, serial number, manufacturer, machine access code (MAC) address, or other such information. The device name may be a product name, trade name, or other name associated with the first device 110a. The user account information may include a user name associated with the user of the first device; the user name may be hashed or otherwise encrypted. The user account information may be available to the first device 110a if it is configured to store that information prior to attempting to join a particular network. The discovery request may further include empty fields or placeholders that may be later modified by other devices, such as a field for an enrollee device list that includes indications of one or more provisioned or unprovisioned devices.

The device network provisioning component 222 of the first device 110a may broadcast the discovery request automatically upon power up and/or in response to user input, such as the pressing a button on the first device 110a. The discovery request may be sent repeatedly at regular or at varying intervals, for example, every 500 milliseconds. If no response is detected after a certain amount of time, for example, one hour, the device 110a may send the discovery request at longer intervals, for example every 10 seconds. The present disclosure is not limited to any particular type or frequency of discovery request.

A second device 110b detects the discovery request and sends a discovery response. The discovery response, like the discovery request, may include a header, payload, or any other such information. In some embodiments, the second device 110b includes some or all of the information contained in the discovery request in the discovery response. The discovery response may further include additional information, such as an enrollee device list of devices enrolled in the network, a list of to-be-provisioned devices, or other such information. The discovery response may further include an indication that the second device 110b is acting as a network registration device, such as a softAP/p2p-GO device. The first device 110a receives (132) the response to the discovery request. As mentioned above, the second device 110b may detect the discovery request, which may be in an expected format. For example, the second device 110b may be configured to detect digital signals at a particular frequency or range of frequencies and may monitor those frequencies for particular sequences of digital bits. The second device 110b may receive the discovery request and analyze it for the expected content. In some embodiments, the second device 110b acts as an access point (AP), and the discovery request comprises an access-point discovery signal. The second device 110b may, for example, employ a software-enabled access point (softAP) and/or peer-to-peer group owner (p2p-GO) protocol to detect the discovery request. In other examples, the second device 110b may also communicate with a separate access point, such as network-access device 115, which provides communication with an external network. In some embodiments, although second device 110b and network-access device 115 are illustrated as separate physical devices, they may be combined into a single device. As explained in greater detail with reference to FIG. 1B, a spoken command to connect the first device to the network is detected (134), and audio representing the command is sent (136) to a remote device.

The first device 110a and/or second device 110b may establish (138) a first communication connection 112a therebetween. In some embodiments, the first communication connection 112a is a Wi-Fi connection, but the first communication connection may be any type of connection, such as, for example a Bluetooth connection, a near-field connection, a wired connection, or the like. The first device 110a may act as a Wi-Fi supplicant and the second device 110b may act as a Wi-Fi access point. In some embodiments, the second device 110b includes two communications connections: one with the first device 110a, which may be a softAP/p2p-GO connection as described above, and another with the network-access device, which may be a Wi-Fi station (STA) connection. In other words, the second device 110b may act as both a Wi-Fi client (with respect to the network-access device 115) and Wi-Fi provider (with respect to the first device 110a). The first communication connection 112a may be a direct wireless connection between the first device 110a and second device 110b, i.e., no other devices are present in the path of the first communication connection 112a. In some embodiments, first communication connection 112a includes the network-access device 115 and/or other devices.

The device network provisioning component 222 of the first device 110a transmits (140) a digital certificate to the second device 110b to be sent to the remote device(s) 120. The digital certificate may be any number, letter, symbol, character, or combination thereof that uniquely or semi-uniquely identifies the first device 110a, such as a device serial number or other device identification information. The digital certificate may be, for example, a randomly generated 4096-bit binary number. The digital certificate may be wholly or partially encrypted. The digital certificate may be assigned to the first device 110a during manufacture or programmed after manufacture but before shipment. The digital certificate may be known, for example, by the device manufacturer, seller, or other entity for purposes of determining the device is of a particular type, owned by a particular individual, or the like. The digital certificate may be stored in non-volatile memory, firmware, fuses, or any other such storage. In some embodiments, the first device 110a permits access to the digital certificate to only verified accessors and user-space applications executing on the first device 110a, for example, cannot access the digital certificate.

Transmission of the digital certificate may include one or more steps. In some embodiments, transmission of the digital certificate includes establishing a first tunnel between the first device 110a and the remote device(s) 120 using the second device 110b. The tunnel may include, for example, the first communication connection 112a and a connection between the second device 110b and the remote device(s) 120. Once this first tunnel is established, the first device 110a may transmit the digital certificate to the second device 110b, which may then in turn transmit the digital certificate to the remote device(s) 120. Alternatively or in addition, the first tunnel may provide access to the remote device(s) 120 from the first device 110a, which may then transmit the digital certificate thereto. Any protocol or service for setting up the transmission of the digital certificate is within the scope of the present disclosure. In some embodiments, creating the first tunnel includes an extensible authentication protocol (EAP) process for the first communication connection 112a and a remote authorization dial-in user service (RADIUS) process for the connection between the second device 110b and the remote device(s) 120. The remote device(s) 120, first device 110a, and/or second device 110b may set up the first, outer tunnel using a first tunneled transport layer security (TTLS) phase and may use the digital certificate with a second TTLS phase to create a second, inner tunnel as described below.

A server network provisioning component 265 of the remote device(s) 120 may determine that the received digital certificate corresponds to a known digital certificate by, for example, comparing the received digital certificate to a database of digital certificates programmed during device manufacture. The remote device(s) 120 may thereby uniquely identify the first device 110a or semi-uniquely identify the first device 110a (i.e., identify the first device 110a as unique within a geographic region). The server network provisioning component 265 may also determine, using the digital certificate or other information identifying the first device 110a, that the first device 110a is associated with a particular user account (for example, by comparing the ID of the first device 110a with the purchase records associated with a user account). The server network provisioning component 265 of the remote device(s) 120 may thereafter transmit an indication to the second device 110b that the first device 110a has been authenticated. In some embodiments, the second device 110b and/or remote device(s) 120 generate a key, such as a master-session key (MSK), based at least in part on authenticating the digital certificate. This key may be transmitted to the second device 110b for use in transmitting the network-login information to the first device 110a.

The network-login information may be stored on or otherwise accessible by the second device 110b and/or the remote device(s) 120. If the network-login information is stored on or otherwise accessible by the second device 110b, the second device 110b may transmit the information to the first device 110a. The remote device(s) 120 may instead or in addition send the second device 110b the network-login information such information is accessible to the remote device(s) 120. The network-login information may be associated with a user profile associated with the network and stored on the remote devices (120). In response, the second device 110b may send the first device 110a the network-login information needed to access the network. The second device 110b may instead encrypt the network-login information using the key received from the remote device(s) 120—or any other key—and transmit the encrypted network-login information.

The first device then receives (142) the network-login information corresponding to the network-access device 115. The network-login information may include a network name, network password, authentication type, or any other such information to provision the first device 110a with the network-access device 115. The second device 110b may send the network-login information to the first device 110a using a protocol, such as a pre-shared key (PSK) handshake protocol. The second device 110b may encrypt the network-login information before sending it to the first device 110a. The first device 110a may then use its device network provisioning component 222 to establish (144) a second communication connection with the network-access device 115 using the network-login information.

Using the second communication connection 112b and/or the tunnel described above, the server network provisioning component 265 may authenticate the first device 110a with one or more applications 290. In some embodiments, the first device 110a is already authenticated with an application 290 by the user or seller.

As shown in FIG. 2, the second device 110b (as well as the first device 110a/114, once provisioned) may receive input audio 11 corresponding to a spoken utterance originating from the user 5. The local device generates input audio data 211 corresponding to the input audio 11 and sends the input audio data 211 to the server(s) 120 for processing.

In the example of device provisioning, the spoken utterance may include a command to provision the first device 110a and may identify the first device 110a (e.g., "connect my new Echo Dot to the network"). The audio data 211 for the utterance may be processed by the server(s) 120 which may send some response data (which may include information identifying the first device 110a) to the second device 110b so that it may output audio data representing a confirmation request ("connect Echo Dot serial number ABC123 to the network correct?"); the second device 110b may thereafter receive input audio 11 corresponding to a confirmation ("Yes"), which then be sent to the server(s) 120 for speech processing and further operations for network connection (e.g., device authorization and further instructions exchanged between server(s) 120 and second device 110b).

Alternatively, the second device 110b may receive input from the user 5 corresponding to input text data 213 via a touch screen providing a virtual keyboard; as mentioned above, the present disclosure is not limited to only input-limited devices. The device 110b may generate input text data corresponding to the input text. The second device 110b may send the input text data to the server(s) 120 via an application operating on the second device 110b and in communication with the server(s) 120 or the input text may come from a companion device 210 in communication with the second device 110b and/or server(s) 120.

If the server(s) 120 receives input audio data from the second device 110b, the server(s) 120 may perform ASR on the input audio data to generate input text data. The server(s) 120 may also perform NLU on the input text data to determine a command represented in the input text data. For example, the NLU component may determine that the input text data corresponds to a request to provision a new device and may send the input text data (and/or other data such as a digital certificate of the first device 110a or other information) to a server network provisioning component 265. The server network provisioning component 265 may process the provisioning request information and determine output text data corresponding to the command where the output text data may include a confirmation request to the user. A TTS module 280 may then create output audio data corresponding to the output text data, and the remote device(s) 120 may then send the output audio data to the second device 110a so the second device 110a can output audio corresponding to the confirmation request. In some embodiments, a user recognition component 295 analyzes the input audio data to determine an identity of the user by, for example, comparing the input audio data to stored audio data associated with the user. The expected user may be determined using a user profile associated with the second device 110b or the first device 110a. If the identity of the user does not match, the server network provisioning component 265 may instruct the second device 110b to cease or otherwise decline provisioning the first device 110a.

FIG. 1B illustrates another embodiment of a system for using a voice interface associated with a second device 110b to provision and/or authenticate a first device 114. The system includes the second device 110b, network-access device 115, network 199, and remote device(s) 120 as discussed above with referenced to FIG. 1A.

In the example of FIG. 1B, the new device to be joined to the network (e.g., first device 114) may not necessarily be known a priori to the remote device(s) 120. For example, the remote device(s) 120 may not have access to a pre-stored digital certificate or other pre-stored identifying information of first device 114 and so thus other techniques may need to be used to determine whether to authorize the provisioning of new device 114.

As with the example of FIG. 1A, the example of FIG. 1B may begin with a first device 114 sending a discovery request. The first device 114 may send the discovery request automatically upon power on, as discussed above with reference to FIG. 1A or, instead or in addition, in response to an input from the user 5. In some embodiments, the input from the user 5 is a button press, and the discovery request includes a Wi-Fi protected setup (WPS) request. The discovery request may include device identification information related to the first device 114, such as device type, model name, device name, manufacturer, machine access code (MAC) address, or other such information.

The second device 110b receives (160) the discovery request from the first device 114. The second device 110b may detect (162) audio corresponding to a spoken command to connect the first device 114 to the network-access device 115. The spoken command may include a wakeword and may include an indication of a name or identifier associated with the first device 114. Alternately, or in addition, the second device 110b may note the device identification information of the first device 114 from the discovery request. The second device 110b may send input audio data representing the device identification information and, in some embodiments, the spoken command to the remote device(s) 120. Alternatively, upon detecting the discovery request from the first device 114, the second device 110b may send the identification information to the server(s) 120, even without a spoken command from the user. In this situation, the server(s) 120 may send a command to the second device 110b to output a confirmation to the user (e.g., "I detected a new Echo Dot was just turned on. Shall I connect it to your network?"). The user's subsequent affirmation ("yes") of the confirmation may then be used to continue/complete provisioning of the first device 114 to the network.

The remote device(s) 120 receive the input audio data and a speech processing component 240 processes it using an ASR component 250, an NLU component 260, or any of the other processing techniques described herein to determine that the spoken command corresponds to a command to provision the first device 114. A server network provisioning component 265 may then determine output text data corresponding to the command and the identification information; the output text data may include a confirmation request to the user that includes the identification information, such as the device name (e.g., "do you wish to connect Echo Dot ABC123 to your network?"). A TTS module 280 may then create output audio data corresponding to the output text data, and the remote device(s) 120 may then send the output audio data to the second device 110b, which receives (166) it. In some embodiments, the user recognition component 295 analyzes the input audio data to determine an identity of the user by, for example, comparing the input audio data to stored audio data associated with the user. If the identity of the user does not match, the server network provisioning component 265 may instruct the second device 110b to cease provisioning the first device 114.

The second device 110b outputs (168) output audio corresponding to the output audio data. The second device 110b may then detect (170) a spoken utterance from the user in response to the confirmation request represented in the output data. The second device 110b may then determine second audio data corresponding to this new spoken utterance, send that second audio data to the remote device(s) 120, which may process it to determine that the second audio data corresponds to a confirmation from the user (e.g., "yes") to connect the first device 114 to the network. The remote device(s) 120 may then transmit to the second device 110b a command to provision the first device 114 to the network. The remote device(s) 120 may also send the second device 110b the network information used to provision the first device if such information is accessible to the remote device(s) 120. The second device 110b transmits (172) network-login information corresponding to the network-access device 115 to the first device 114. In some embodiments, the second device 110b includes an interface for communicating with the first device 114, such as a peer-to-peer group owner (p2p-GO) interface. The transmission of the network-login information may be part of a Wi-Fi protected setup (WPS) procedure with the first device 114.

As indicated above, the system may operate using various speech processing and other components as described in FIG. 2. The various components may be located on the same or on different physical devices. Communication between various components may occur directly or across a network(s) 199. Below is a discussion of those components, followed by a further discussion of network provisioning.

The device 110 may include a device wakeword detection component 220, a device network provisioning component 222, and/or other components. The device wakeword detection component 220 may include instructions to provision another device, as discussed above. In some embodiments, the device wakeword detection component 220 includes a digital certificate.

The device 110 may receive input audio 11 using an audio capture component, such as a microphone or microphone array. The device 110, using the wakeword detection component 220, may process audio data corresponding to the input audio 11 to determine if a keyword (e.g., a wakeword) is detected in the audio data. Following detection of a wakeword, the device 110a may send input audio data 211 to the server(s) 120. The input audio data 211 at least partially corresponds to input audio captured subsequent to input audio corresponding to the wakeword. That is, the input audio data 211 corresponds to a spoken command following a spoken wakeword, and optionally includes the spoken wakeword.

Upon receipt by the server(s) 120, the digital certificate, input audio data 211, or other data may be sent to an orchestrator component 230. The orchestrator component 230 may include memory and logic that enables the orchestrator component 230 to transmit various pieces and forms of data to various components of the system.

The orchestrator component 230 may send the digital certificate to the server network provisioning component 265 and/or the input audio data 211 to a speech processing component 240. An ASR component 250 of the speech processing component 240 transcribes the input audio data 211 into input text data representing one more hypotheses representing the spoken command represented in the input audio data 211. The ASR component 250 interprets the spoken command represented in the input audio data 211 based on a similarity between the spoken command and pre-established language models. For example, the ASR component 250 may compare the input audio data 211 with models for sounds (e.g., subword units, such as phonemes, senons, etc.) and sequences of sounds to identify words that match the sequence of sounds corresponding to the spoken command represented in the input audio data 211. The ASR component 250 sends the input text data generated thereby to an NLU component 260 of the speech processing component 260. The input text data sent from the ASR component 250 to the NLU component 260 may include a top scoring hypothesis or may include an N-best list including multiple hypotheses. An N-best list may additionally include a score associated with each hypothesis represented therein. Each score may indicate a confidence of ASR processing performed with respect to the hypothesis with which it is associated. While FIG. 2 illustrates components of the server(s) 120 communicating via the orchestrator component 230, one skilled in the art will appreciated that various components of the server(s) 120 may communication directly.

Alternatively, a non-input-limited device 210 may send input text data 213 to the server(s) 120. Upon receipt by the server(s) 120, the input text data 213 may be sent to the orchestrator component 230. The orchestrator component 230 may send the input text data 213 to the NLU component 260.

The NLU component 260 attempts to make a semantic interpretation of the phrases or statements represented in the input text data input therein. That is, the NLU component 260 determines one or more meanings associated with the phrases or statements represented in the input text data based on individual words represented in the input text data. The NLU component 260 determines an intent of the command represented in the input text data (e.g., an action that a user desires be performed) as well as pertinent pieces of information in the input text data that allow a device (e.g., the device 110a, the device 110b, the server(s) 120, the application server(s) 125, etc.) to execute the intent. For example, if the input text data corresponds to "call mom," the NLU component 260 may determine a user intended to activate a telephone in his/her device and to initiate a call with a contact matching the entity "mom."

The server(s) 120 may include device profile storage 270. The device profile storage 270 may include a variety of information related to individual devices, groups of device, etc. that interact with the system. The device profile storage 270 may include, for each device or group of devices, a network ID, a configuration status, a registration status, and/or a product name. As illustrated, the device profile storage 270 is implemented as part of the server(s) 120. However, it should be appreciated that the device profile storage 270 may be located proximate to the server(s) 120, or may otherwise be in communication with the server(s) 120, for example over the network(s) 199. The server(s) 120 may also include various applications 290. It should be appreciated that the server(s) 120 may additionally or alternatively communicate with one or more application servers executing third-party applications.

An "application," as used herein, may be considered synonymous with a "skill." A skill may be software akin to an application. That is, a skill may enable the server(s) 120 and/or the application server(s) to execute specific functionality in order to provide output data to the user 5. The system may be configured with more than one skill. A skill may either be executed by the server(s) 120 or merely associated with the server(s) 120 (i.e., one executed by the application server(s)).

The server(s) 120 may include a TTS component 280 that generates audio data from text data using one or more different methods. In one method of synthesis called unit selection, the TTS component 280 matches text data against a database of recorded speech. The TTS component 280 may select matching units of recorded speech matching the text data and concatenates the units together to form audio data. In another method of synthesis, called parametric synthesis, the TTS component 280 varies parameters such as frequency, volume, and noise to create audio data including an artificial speech waveform. Parametric synthesis uses a computerized voice generator, sometimes called a vocoder.

The system may include a server network provisioning component 265 that, as described above, receives and authenticates a digital certificate associated with the device 110. The device profile storage 270 may include a database of known valid digital certificates to which the server network provisioning component 265 compares the received digital certificate. The server network provisioning component 265 may further communicate with the device 110 to thereby authenticate the device 110 with an application 290.

Figure 3:
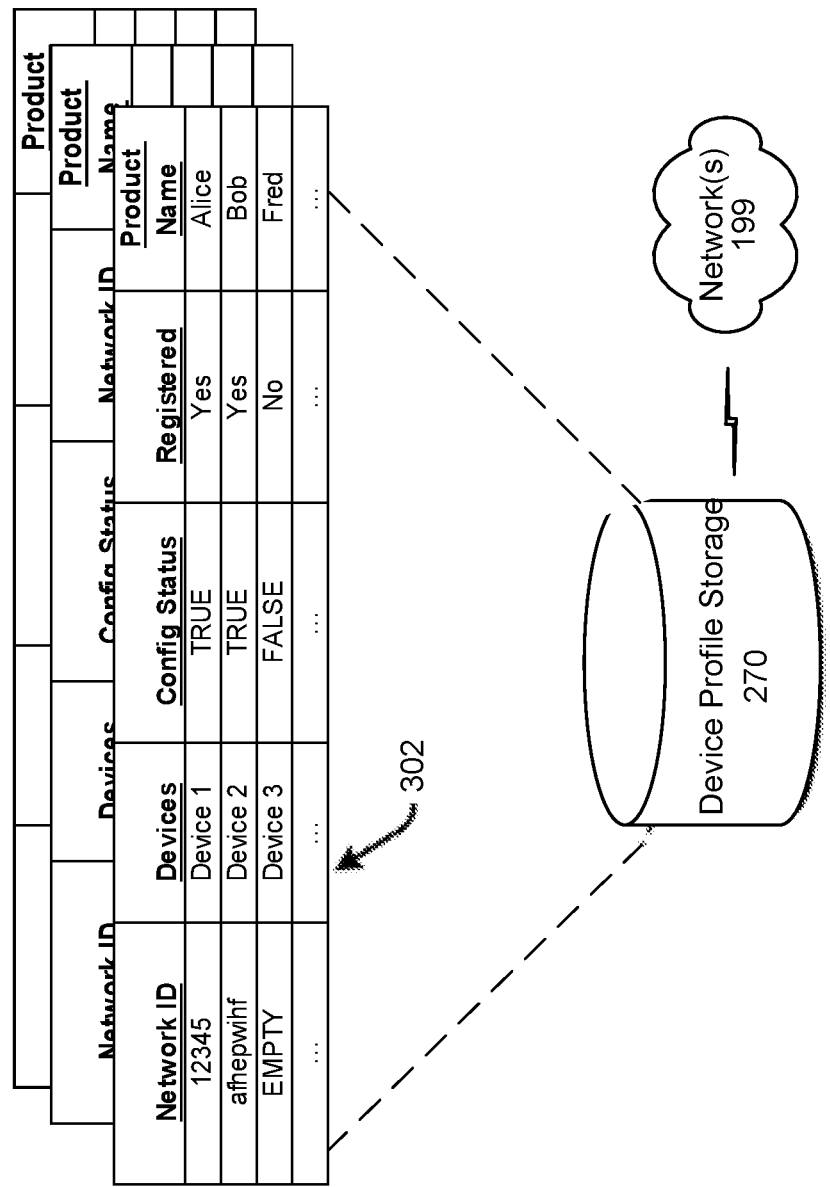
FIG. 3 illustrates data stored and associated with device profiles according to embodiments of the present disclosure.

FIG. 3 illustrates the device profile storage 270 that includes data regarding device profiles as well as individual device profiles 302. Each device profile 302 may include information indicating various devices. For each of the various devices, a device profile 302 may indicate a network ID, a configuration status, a registration status, and/or a product name. Each device profile 302 may additionally include other data not explicitly illustrated.

Figure 4:
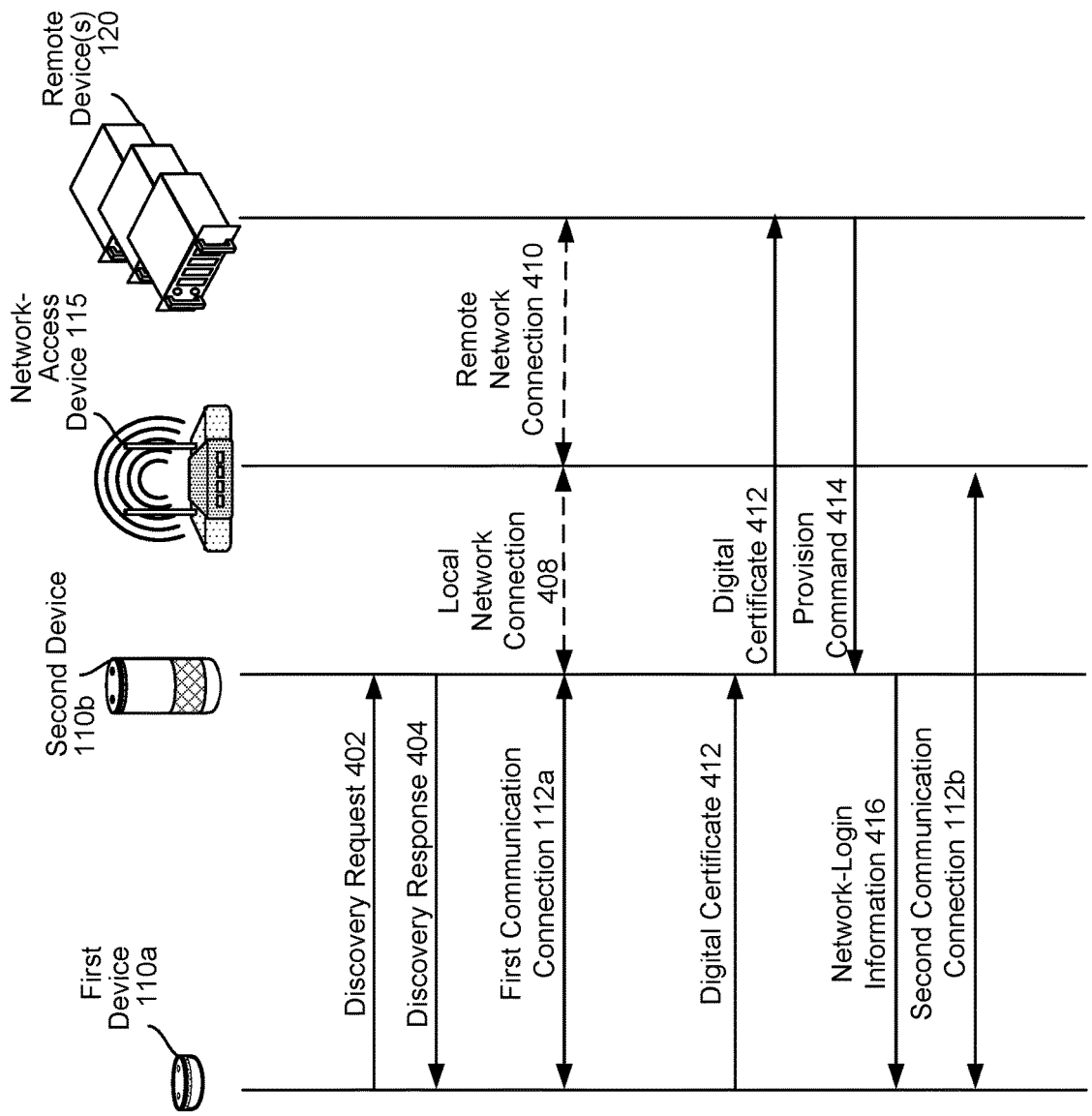
FIGS. 4-9 illustrate process flows for provisioning devices according to embodiments of the present disclosure.

FIG. 4 illustrates a process flow for provisioning a first device 110a, as described above with reference to FIG. 1A. The first device 110a sends a discovery request 402 to a second device 110b, which may include the device network provisioning component 222 described above, and receives a discovery response 404 back in response. The first device 110a and the second device 110b establish a first communications connection 406. The second device 110a is connected to a network-access device 115 by a local network connection 408 (that may have been established before the first device 110a sends the discovery request), and the network-access device 115 is connected to remote device(s) 120 by a remote network connection 410. As mentioned above, the remote device(s) 120 may include the server network device provisioning component 265, the local network connection 408 may be a Wi-Fi connection, and the remote network connection 410 may be a connection to the Internet. The first communication connection 406 may be a peer-to-peer or direct connection and may use extensible authentication protocol (EAP). In some embodiments, the second device 110b sends 802.11 management frames to the first device 110a, and the first communication connection 406 includes a layer-2 802.11 link. A connection between the first device 110a and the remote device(s) 120 may be a tunnel connection and may use a tunneled transport layer security (TTLS) protocol, as known in the art.

The first device 110a may transmit a digital certificate 412 to the remote device(s) 120 via the second device 110b using, for example, the tunnel described above. The second device 110b may thereafter transmit the digital certificate 412 to the remote device(s) 120. The remote device(s) 120 authenticate the first device 110a using the digital certificate (e.g., determines that the first device 110a is an authorized device associated with a particular user account, such as the same user account associated with second device 110b) and transmits a provision command 414 the first device 110a to the second device 110b. As mentioned above, the first device 110a and/or the remote device(s) 120 may store network-login information; the remote device(s) 120 may transmit the provision command 414 and/or the network-login information to the second device 110b. The first device 110a receives network-login information 416 (such as the Wi-Fi password to connect to the network-access device 115) from the second device 110b and establishes a second communication connection 112b with the network-access device 115.

Figure 5:
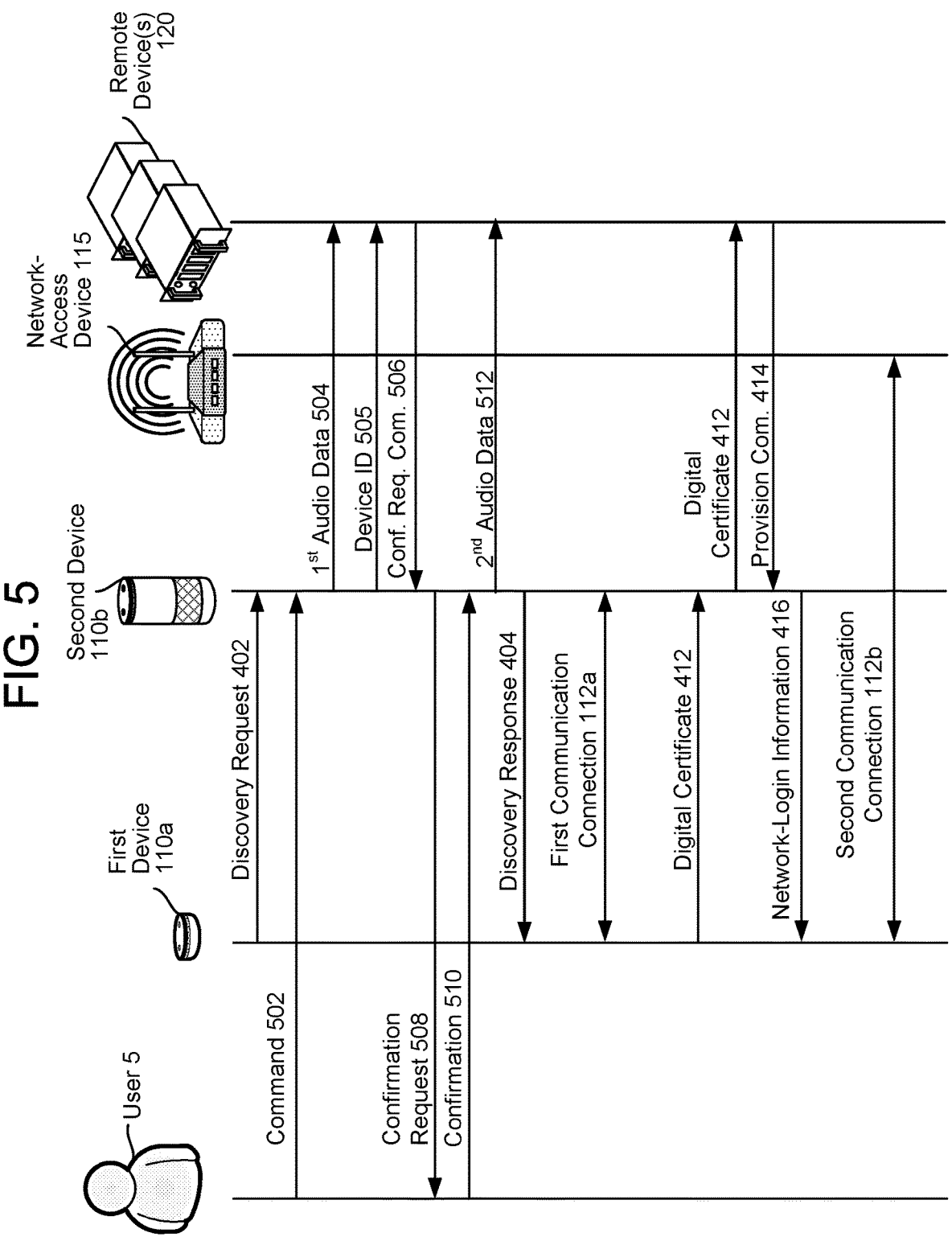

FIG. 5 illustrates a process flow for provisioning a first device 110a that includes a spoken confirmation and, in some embodiments, a spoken command. In some embodiments, the user 5 issues a spoken command 502 to provision the first device 110a. The spoken command 502 may include a wakeword and/or device identification information related to the first device 110a. Before or after receiving the spoken command, the second device 110b may receive a discovery request 402 from the first device 110a, which may include device identification information. The second device 110b detects audio of the command 502, converts the audio into first audio data and sends the first audio data 504 along with the device identification information 505 (e.g., the first device's device type, model name, device name, manufacturer, digital certificate and/or other identifying information) to the remote device(s) 120.

The remote device(s) 120 may then process the audio data 504 and/or device identification information 505 to determine a confirmation request command 506 and then sends output audio data corresponding to the confirmation-request command 506 to the second device 110b to enable the second device 110b to prompt the user to confirm that the first device 110a is to be authenticated. The output audio data may include information identifying the first device 110a, such as a serial number, model name, or other information obtained from the device identification information 505 of the first device 110a sent to the remote device(s) 120. The second device 110b may output audio data 508 corresponding to the confirmation request 508 that includes a request to confirm provisioning the first device 110a. The output audio data 508 may correspond to output audio data created by the second device 110b and/or remote device(s) 120. The user may thereafter issue a second utterance corresponding to a spoken confirmation 510 in response to the confirmation request. The second device 110b then converts the second utterance 510 into second audio data and sends the second audio data 512 to the remote device(s) 120 which then processes the second audio data to determine the confirmation to authenticate the first device. The remote device(s) 120 may then process the digital certificate/device identification information to determine that the first device is authorized. The remote device(s) 120 then sends a provisioning command 414 to the second device 110b to continue the provisioning process for first device 110a. The provisioning command 514 may include network-login information. In response to receiving the provisioning command 514, and as also described above with reference to FIG. 4, the second device 110b establishes a first communication connection 112a with the first device 110a and transmits login information 416 thereto. The first device 110a uses the network-login information 416 to establish a second communications connection 112b with the network-access device 115.

The spoken command 502, confirmation request 508, and/or spoken confirmation 510 may occur after the discovery request 402 but before the discovery response 404, as illustrated; in other embodiments, the spoken command 502, confirmation request 508, and/or spoken confirmation 510 occur earlier or later in time than the discovery request 402 and/or discovery response 404.

Figure 6:
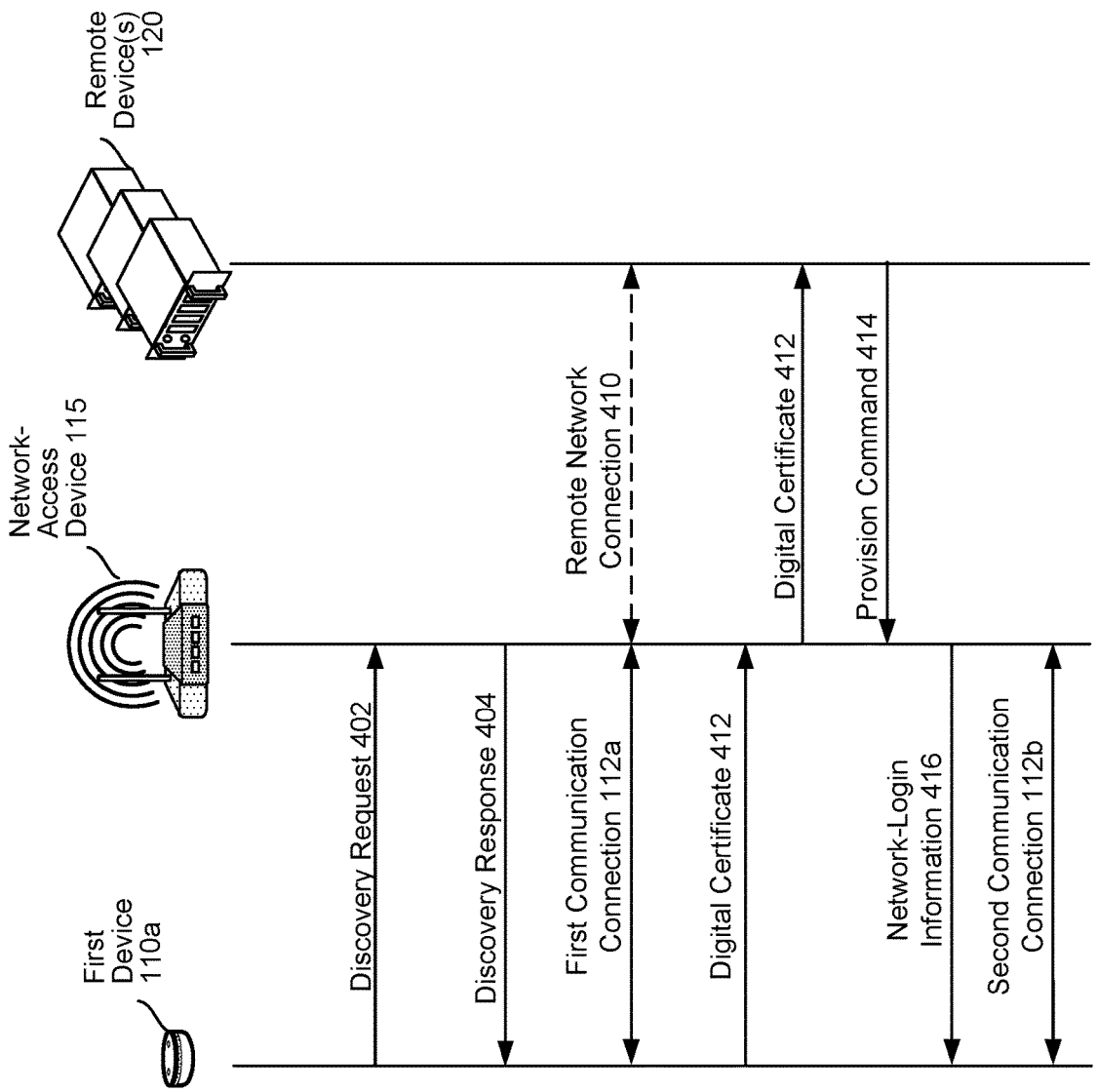

FIG. 6 illustrates a process flow for provisioning a first device 110a to communicate with a network-access device 115; the first device 110a may be already authenticated (i.e., logged into using a user name and user password) to remote device(s) 120. The first device 110a broadcasts a discovery request 402 that is received by the network-access device 115, which transmits a discovery response 404 to the first device 110a. The network-access device 115 establishes a first communication connection 112a with the first device 110a; in some embodiments, the first communication connection 112a involves use of an authenticator SSID different from a standard SSID associated with the network-access device 115. As described above, a remote network connection 408 connects the network-access device to the remote device(s) 120. The first device 110a transmits a digital certificate 412 to the network-access device 115 and/or the remote device(s) 120 and receives network-login information 416 in response. A second communication connection 112b is established between the first device 110a and the network-access device 115 using the network-login information 416.

Figure 7:
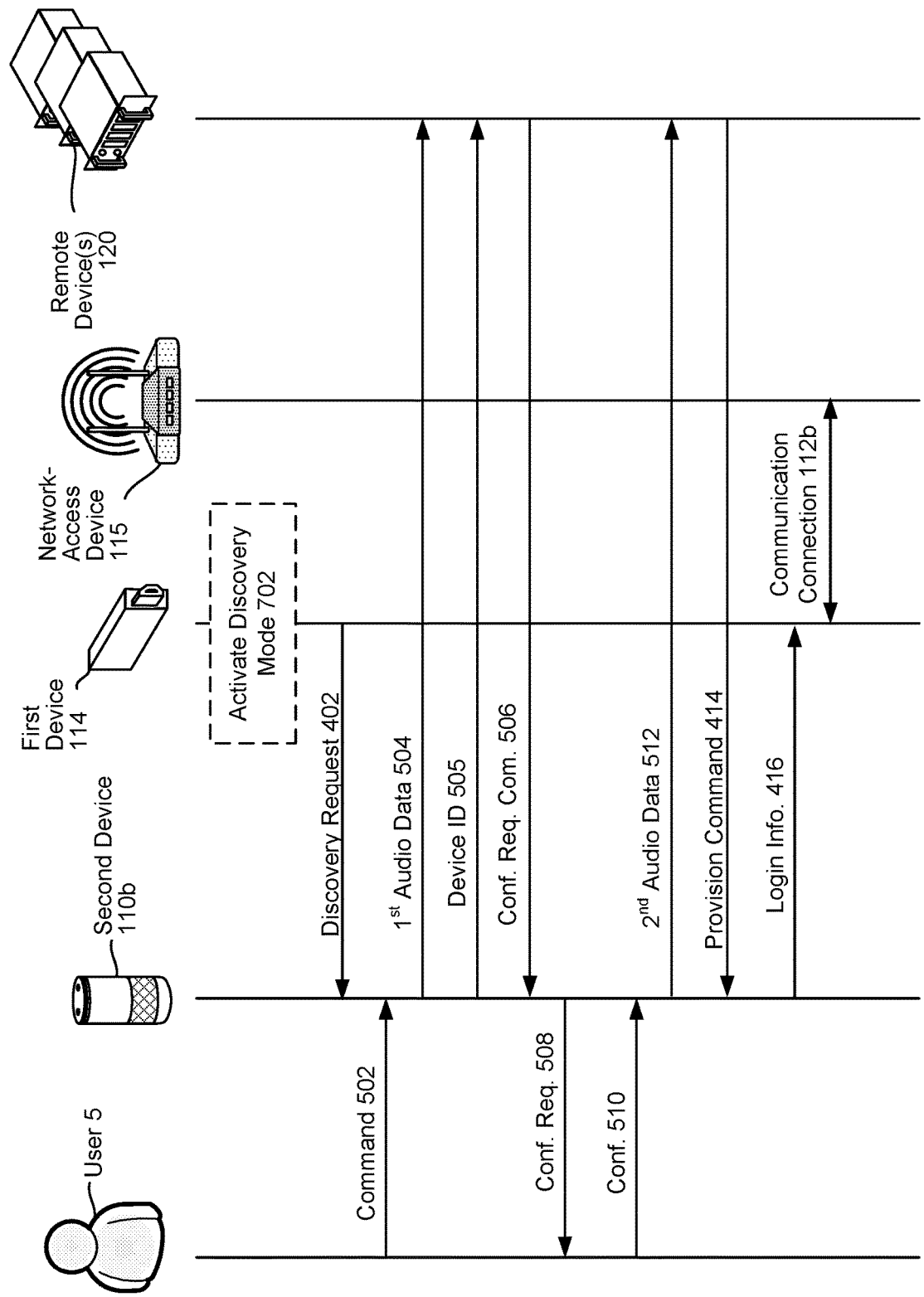

FIG. 7 illustrates a process flow for provisioning a first device 114. In the example of FIG. 7, a spoken command is used to provision the first device 114. A discovery mode 702 is activated on the first device 114 by, for example, detecting a button press on the first device 114. The second device broadcasts a discovery request 404 that is received by the second device 110b; the discovery request 404 may include device identification information. The device identification information may be part of the discovery request 4E04, such as part of a Wi-Fi frame, or may be sent separately. The second device 110b receives a command 502 spoken by a user 5 to provision the second device 114 (e.g., connect the first device 114 to a wireless network-device 115); the command may include device identification information related to the first device 114. The first device 114 sends first audio data 504 corresponding to the spoken command 502 and the device identification information 505 to the remote device(s) 120 which, as explained above, may perform ASR, NLU, and/or other processing techniques to determine the command from the first audio data 504 and/or device identification information 505. The remote device(s) 120 transmits output audio data 506 corresponding to the command 502 and device identification information 505 to the second device 110b, which outputs output audio 508 corresponding to the first output audio data 504. In some embodiments, the first device receives a confirmation 510 from the user. If the confirmation 510 is a spoken confirmation, the second device 110b may send second audio data 512 corresponding to the confirmation to the remote device(s) 120 for processing, as discussed above in reference to FIG. 5, and may receive a provision command 514 in response. Other confirmation methods may also be used, including the user pressing a button (such as a virtual button on a touch display) of second device 110b, confirming using a companion device, or the like. The first device 114 transmits network-login information 416 to the first device 114 which may then use the network-login information 416 to establish a communication connection 112b with the network-access device 115.

Figure 8:
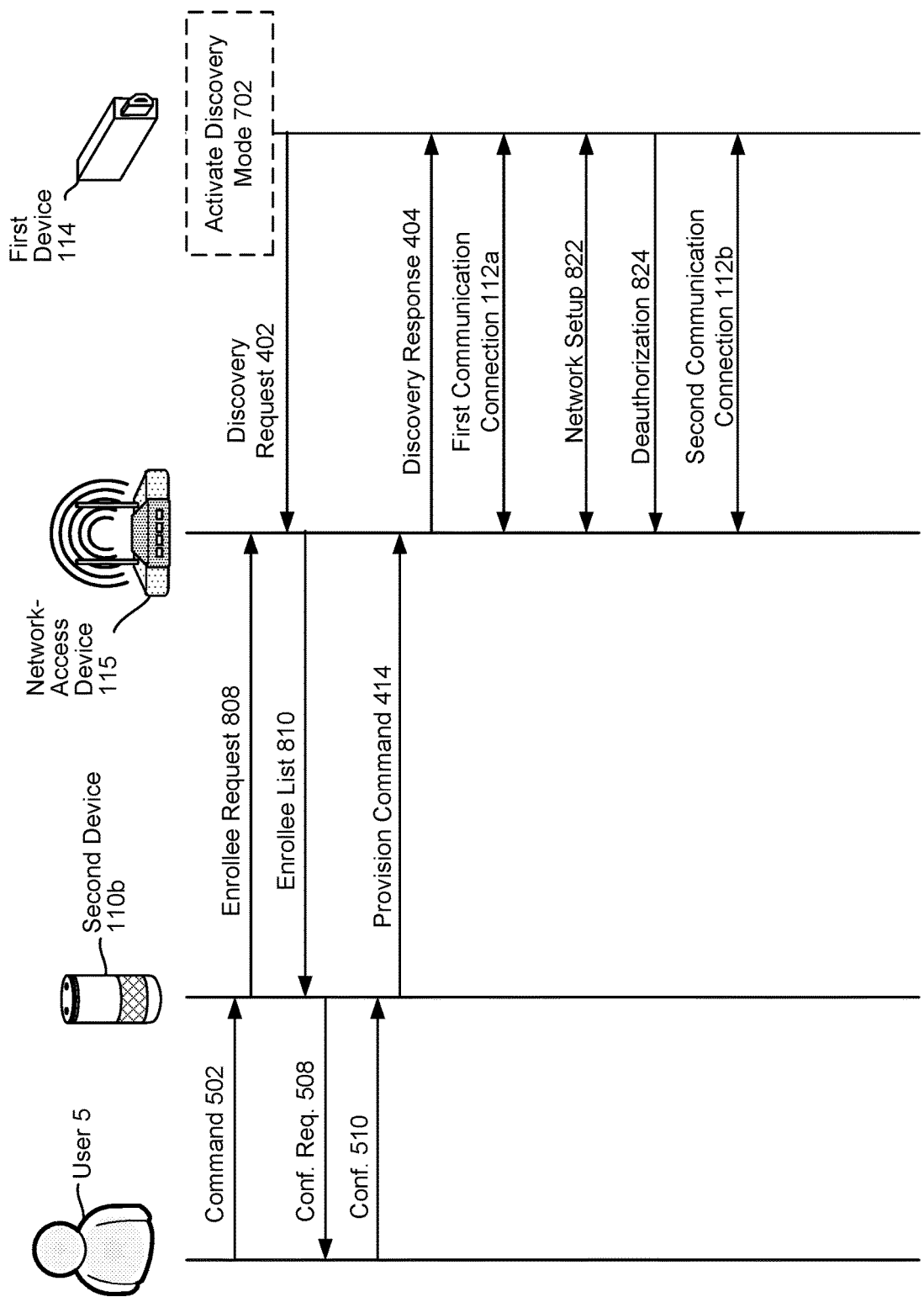

FIG. 8 illustrates a process flow for provisioning a new first device 114 that includes a spoken confirmation received a second device 110b. (Although not shown in FIG. 8, audio data corresponding to utterance(s) of the user 5 may be sent from the second device 110b to the remote device(s) 120 for processing and for further instruction to the second device 110b, as described above in reference to other figures.) A discovery mode is activated 702 on the first device 114 by, for example, detecting a button press on the first device 114. The first device 114 broadcasts a discovery request 402 that is received by the network-access device 115; the discovery request 402 may include identification information corresponding to the first device 114, such as a device name, model name, model type, MAC address, or other such information. The second device 110b sends an enrollee request 808 to the network-access device 115. In some embodiments, the second device 110b first receives a spoken command 502 to provision the first device 114; in other embodiments, the enrollee request 808 is sent even if no spoken command is received. The second device 110b receives an enrollee list 810 from the network-access device 115 that includes some or all of the device identification information contained in the discovery request 402. The second device 110b outputs output data corresponding to the device identification information and receives a confirmation 510 in response. The second device 110b then transmits a command to initiate provisioning 414 the first device 114 to the network-access device 115.

The network-access device 115 transmits a discovery response 404 to the first device 114 and creates a first communication connection 112a with the first device 114. The first communication connection 112a may include a WPS session; the network-access device 115 may confirm that the identification information, such as the received MAC address, matches corresponding information associated with the first device 114. The network-access device 115 and first device 114 exchange network-setup commands 822, which may include WPS EAP M1~M8 messages, to transmit network-login information to the first device 114. The first communication 820 may be de-authorized 824, and a second communication connection 826, such as a Wi-Fi connection, is created using the network-login information.

Figure 9:
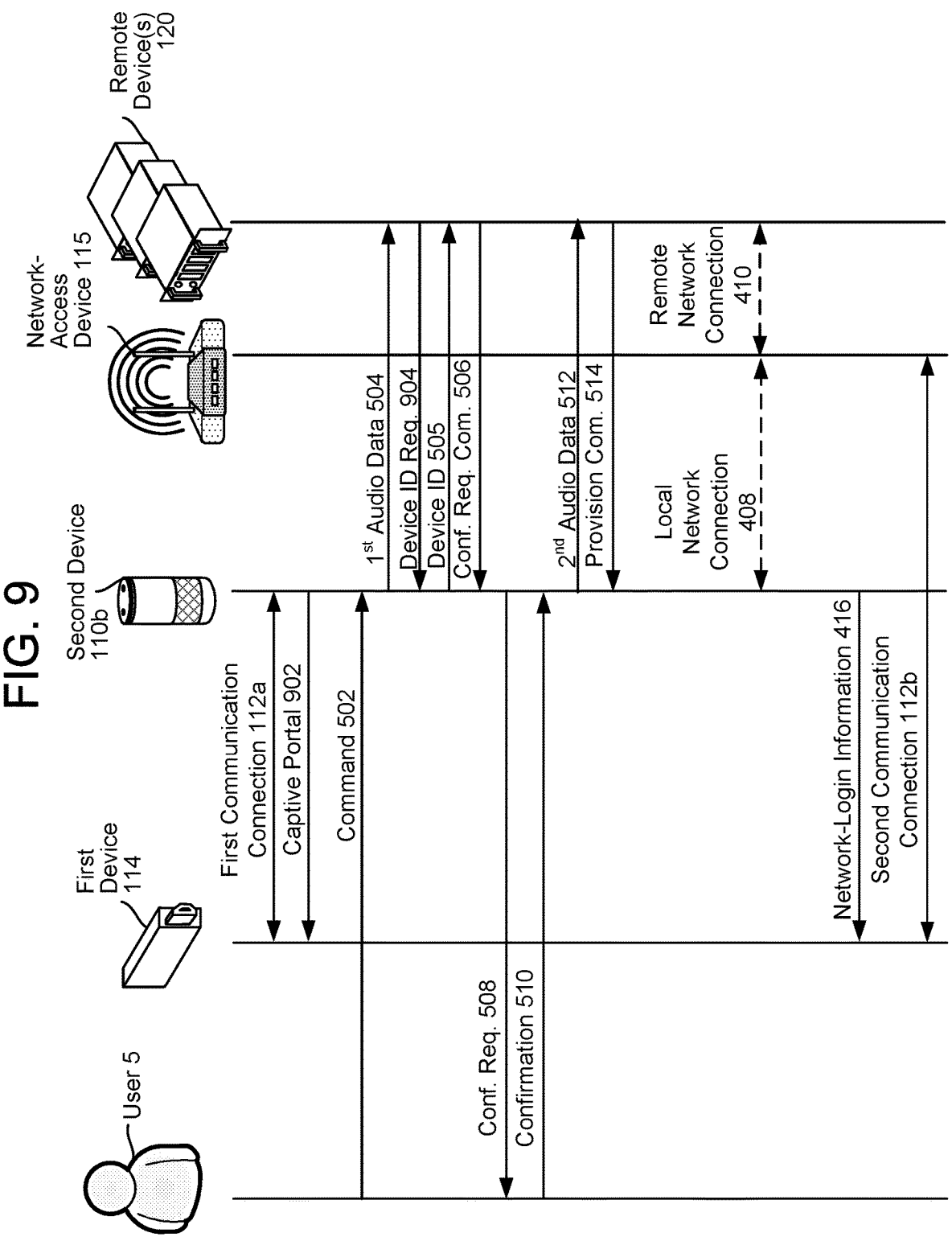

FIG. 9 illustrates a process flow for provisioning a new first device 114 using a captive-portal communication. As the term is used herein, a captive portal includes a web page or similar information that a potential user of a network is obliged to view and/or interact with before a network-access device grants full access to the network to a device associated with the user. The captive-portal data may include instructions or other guidance for provisioning the first device 114 to the network, such as a prompt to utter a command to provision the first device 114. A captive portal may be used with an open network; an open network may be any network that allows a device to connect without requiring a network password, such as a non-password-protected Wi-Fi network. A provider of an open network, such as an airport, library, or café, may use a captive portal to display terms and conditions for use of the open network, for collecting payment information, or any other such use.

The first device 114 may be a device capable of running a web browser and displaying a web page on a screen of the first device 114. The first device 114 may be, for example, a laptop computer, desktop computer, tablet computer, smart phone, or other such device. In some embodiments, the second device 110b broadcasts an open (i.e., not password protected) network, and the first device 114 connects to the open network to establish a first communication connection 112a. The second device 110b sends captive-portal data 902 to the first device 114; the first device 114 may display a web page corresponding to the captive-portal data 902. Alternatively or in addition, the captive-portal data 902 may redirect to an application capable of executing on the first device 114. The application may access network-configuration settings on the first device 114 to later provision the first device 114 to the network, as explained below. In response to receiving the captive-portal data, the first device 114 may prompt the user for an input confirming the establishment of the first communication connection 112a.

As described above, the second device 110b may receive an utterance corresponding to a spoken command 502 from a user 5 commanding that the second device 110b allow the first device 114 to be provisioned to the network-access device 115. First audio data 504 corresponding to the command 502 may be transmitted from the second device 110b to the remote device(s) 120. The remote device(s) 120 may transmit a request 904 for device identification information to the second device 110b. In some embodiments, the second device 110b obtained the device identification information during establishment of the first communication connection 112a; in other embodiments, the second device 110b transmits a request for the device identification information to the first device 114 in response to receipt of the device identification information request 904 and receives the device identification information therefrom in response thereto. The second device 110b transmits the device identification information 505 to the remote device(s) 120.

The remote device(s) 120 transmit a confirmation request command 506, which may include some or all of the device identification information 505, to the second device, which outputs a confirmation request 508 that includes audio data corresponding to the device identification information 505. The second device 110b receives audio data corresponding to a spoken confirmation 510 and transmits second audio data 512 corresponding to the spoken confirmation 510 to the remote device(s) 120. After determining that the second audio data 512 corresponds to a confirmation command, the remote device(s) 120 transmit a provision command 514 to the second device 110b. The second device 110b transmits network-login information 416 to the first device 114 and establishes the second communication connection 112b. As discussed above, the network-login information 416 may be stored on the second device 110b and/or remote device(s) 120. An application executing on the first device 114 may use the network-login information to provision the first device 114 to the network. In some embodiments, the first communication connection 112a is disconnected by the second device 110b by directly disconnecting the connection 112a or by instructing the first device 114 to disconnect (by, for example, sharing a special credentials file). Alternatively or in addition, the user may disconnect the first communication connection 112a by manipulating a control associated with the first device 114 and/or second device 110b. The first device 114 and/or second device 110b may report successfully creating the second communication connection 112b.

Figure 10:
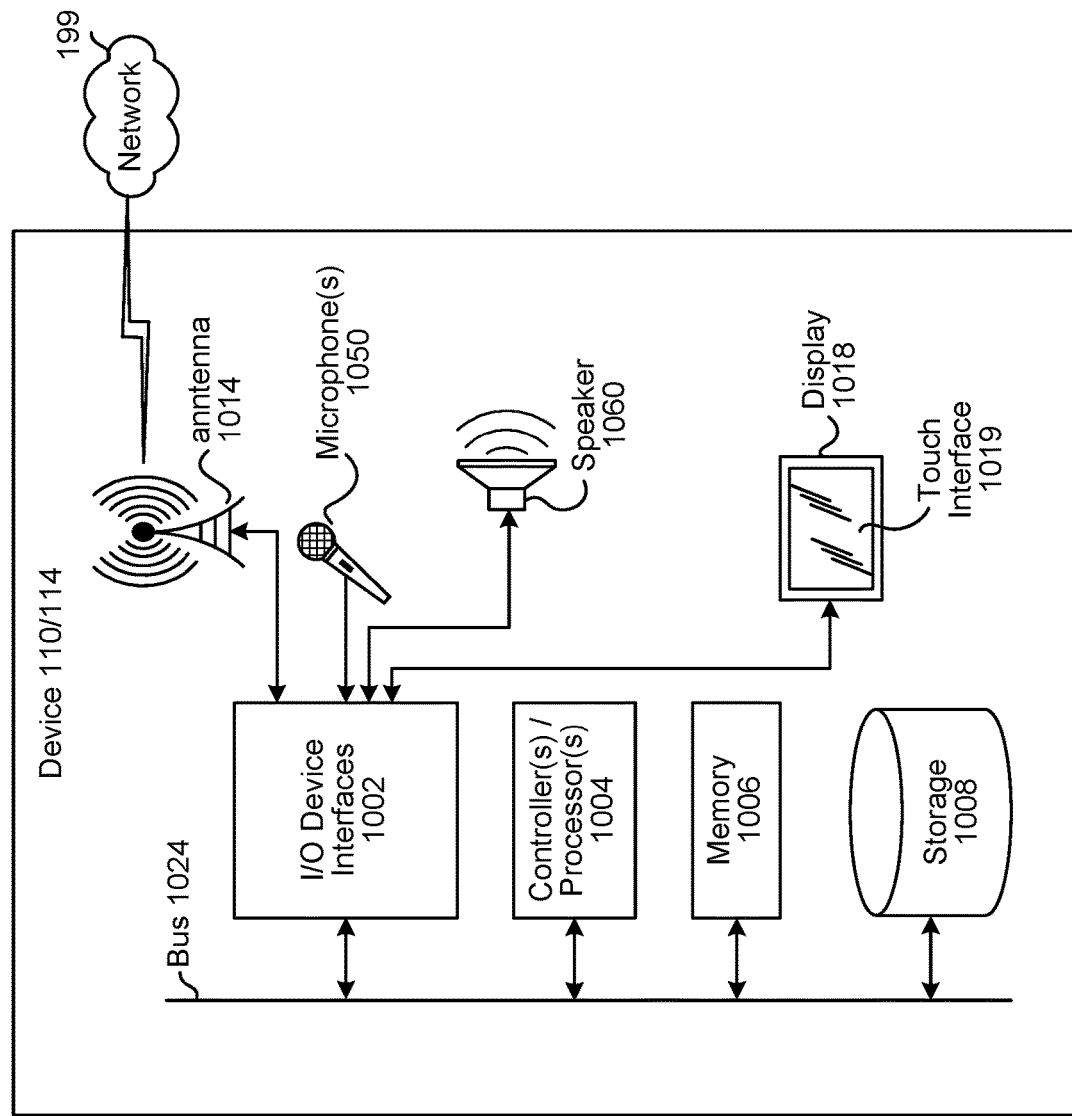
FIG. 10 is a block diagram conceptually illustrating example components of a device according to embodiments of the present disclosure.
Figure 11:
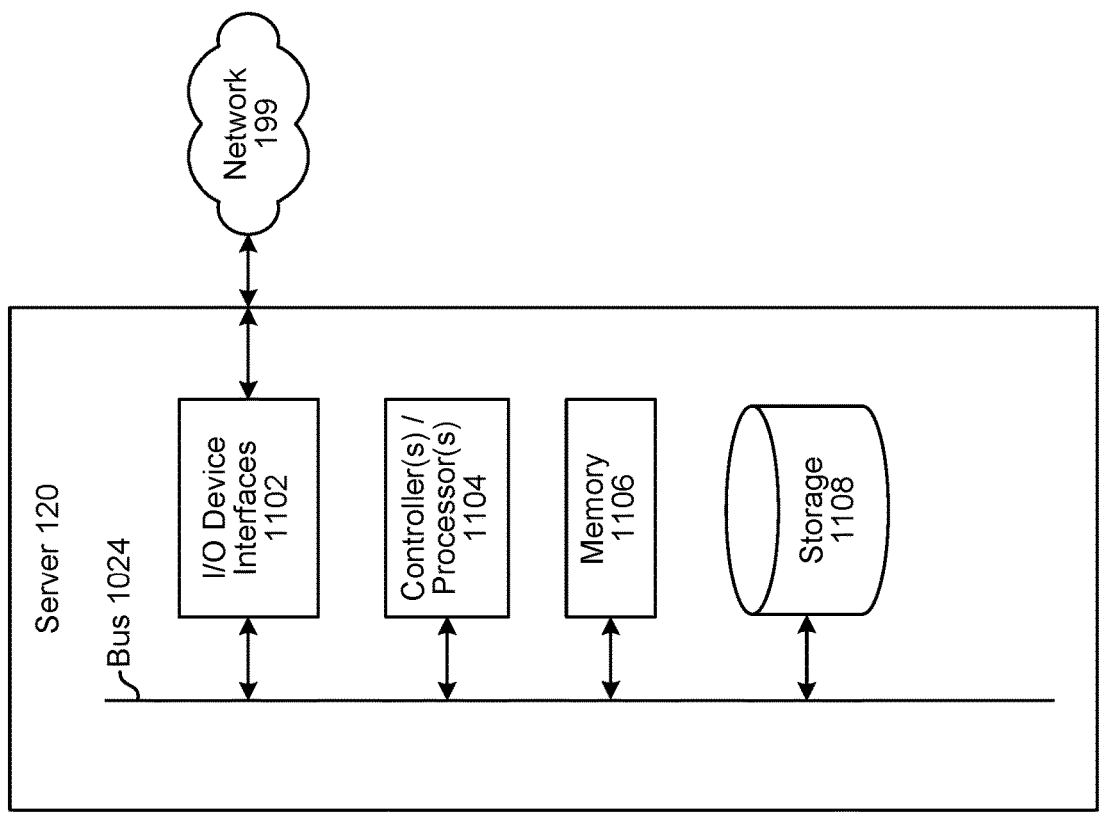
FIG. 11 is a block diagram conceptually illustrating example components of a server according to embodiments of the present disclosure.

FIG. 10 is a block diagram conceptually illustrating a local device 110/114 that may be used with the described system. FIG. 11 is a block diagram conceptually illustrating example components of a remote device, such as a remote server 120, that may assist with network provisioning, ASR, NLU processing, command processing, or the like. Multiple such servers 120 may be included in the system, such as one server(s) 120 for network provisioning, one server(s) for performing ASR, one server(s) 120 for performing NLU, etc. In operation, each of these devices (or groups of devices) may include computer-readable and computer-executable instructions that reside on the respective device (110/120), as will be discussed further below.

Each of these devices (110/114/120) may include one or more controllers/processors (1004/1104), which may each include a central processing unit (CPU) for processing data and computer-readable instructions and a memory (1006/1106) for storing data and instructions of the respective device. The memories (1006/1106) may individually include volatile random-access memory (RAM), non-volatile read only memory (ROM), non-volatile magnetoresistive (MRAM) memory, and/or other types of memory. Each device may also include a data-storage component (1008/1108), for storing data and controller/processor-executable instructions. Each data-storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1002/1102).

Computer instructions for operating each device (110/114/120) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/114/120) includes input/output device interfaces (1002/1102). A variety of components may be connected through the input/output device interfaces, as will be discussed further below. Additionally, each device (110/114/120) may include an address/data bus (1024/1124) for conveying data among components of the respective device. Each component within a device (110/114/120) may also be directly connected to other components in addition to (or instead of) being connected to other components across the bus (1024/1124).

Referring to the device 110/114 of FIG. 10, the device 110/114 may include a display 1018, which may comprise a touch interface 1019. The device 110/114 may instead be input-limited or headless (e.g., without a display and/or touch interface) and may primarily rely on other input mechanisms, such as spoken commands, wireless communications, etc. As a way of indicating to a user that a communication connection to another device has been created, the device 110/114 may be configured with a visual indicator, such as an LED or similar component (not illustrated), that may change color, flash, or otherwise provide visual indications by the device 110/114. The device 110/114 may also include input/output device interfaces 1002 that connect to a variety of components, such as an audio output component like a speaker 1060, a wired or wireless headset (not illustrated), or other component capable of outputting audio. The device 110/114 may also include an audio capture component. The audio capture component may be, for example, a microphone 1050 or array of microphones, a wired or wireless headset (not illustrated), etc. The microphone 1050 may be configured to capture audio. If an array of microphones is included, an approximate distance to a sound's point of origin may be determined; acoustic localization, based on time and/or amplitude differences between sounds captured by different microphones of the array, may be performed. The device 110/114 (using microphone 1050, wakeword detection module 220, ASR module 250, etc.) may be configured to determine audio data corresponding to detected audio. The device 110/114 (using input/output device interfaces 1002, antenna 1014, etc.) may also be configured to transmit the audio data to server 120 for further processing or to process the data using internal components such as a wakeword detection module 220.

For example, via the antenna(s), the input/output device interfaces 1002 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110/114 may include a wakeword detection module 220, which may be a separate component or may be included in an ASR module 250. The wakeword detection module 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110/114 may be configured collectively to identify a set of the directional audio signals in which the wake expression is detected or in which the wake expression is likely to have occurred.

The wakeword detection module 220 receives captured audio and processes the audio (for example, using model(s) 232) to determine whether the audio corresponds to particular keywords recognizable by the device 110 and/or system 100. The storage 1008 may store data relating to keywords and functions to enable the wakeword detection module 220 to perform the algorithms and methods described above. The locally stored speech models may be pre-configured based on known information, prior to the device 110/114 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110/114 prior to the user device 110/114 being delivered to the user or configured to access the network by the user. The wakeword detection module 220 may access the storage 1008 and compare the captured audio to the stored models and audio sequences using audio comparison, pattern recognition, keyword spotting, audio signature, and/or other audio processing techniques.

As noted above, multiple devices may be employed in a single speech processing system. In such a multi-device system, each of the devices may include different components for performing different aspects of the speech processing. The multiple devices may include overlapping components. The components of the devices 110/114 and server 120, as illustrated in FIGS. 9 and 10, are exemplary, and may be located a stand-alone device or may be included, in whole or in part, as a component of a larger device or system. The concepts disclosed herein may be applied within a number of different devices and computer systems, including, for example, general-purpose computing systems, speech processing systems, and distributed computing environments.

Figure 12:
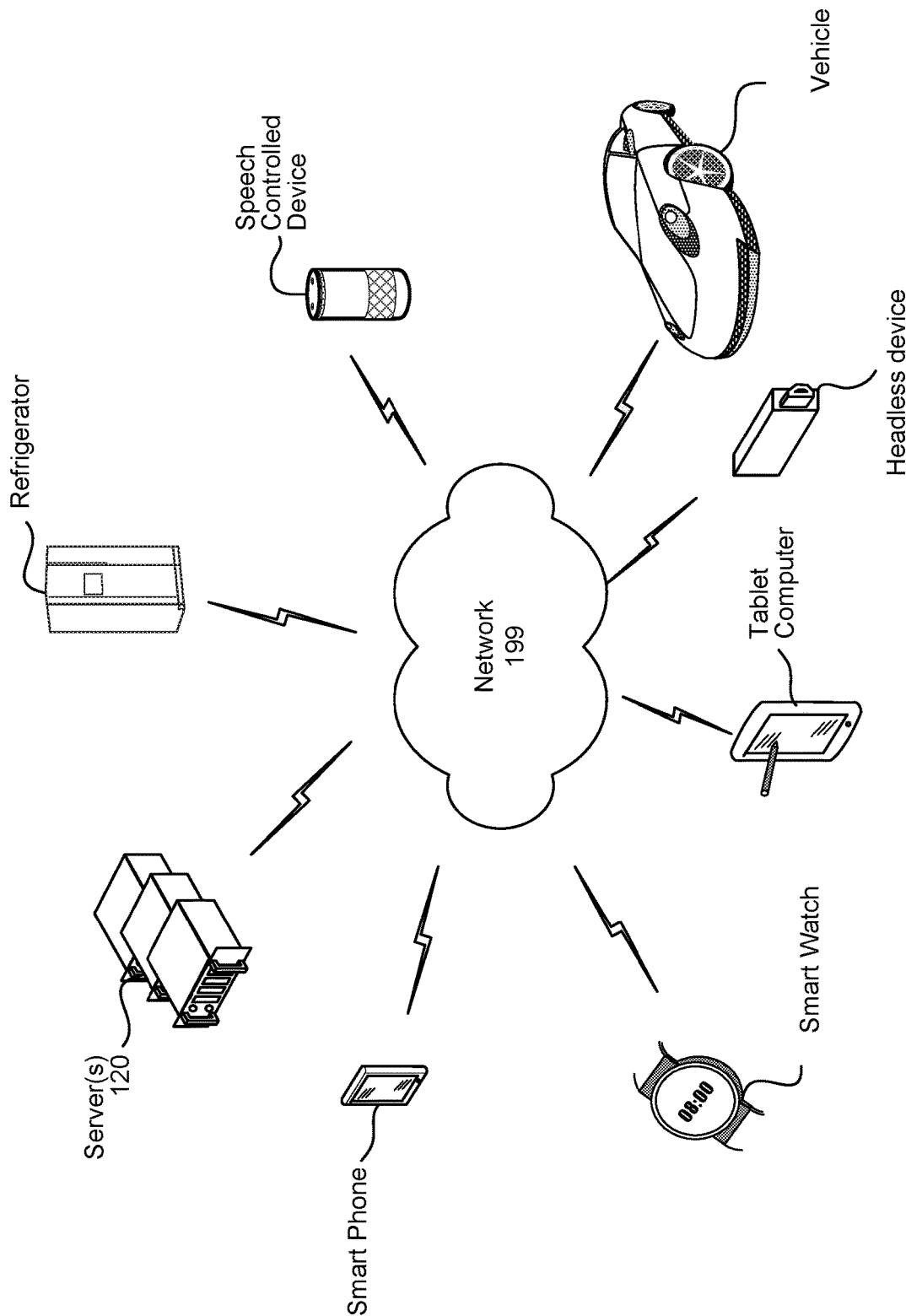
FIG. 12 illustrates an example of a computer network for use with the device provisioning system.

As illustrated in FIG. 12 multiple devices may contain components of the system 100 and the devices may be connected over a network 199. Network 199 may include a local or private network or may include a wide network such as the internet. Devices may be connected to the network 199 through either wired or wireless connections. For example, a speech controlled device, a tablet computer, a smart phone, a refrigerator, a smart watch, headless device, and/or a vehicle may be connected to the network 199 through a wireless service provider, over a WiFi or cellular network connection or the like. Other devices are included as network-connected support devices, such as server(s) 120, or others. The support devices may connect to the network 199 through a wired connection or wireless connection. Networked devices may capture audio using one-or-more built-in or connected microphones 1050 or audio capture devices, with processing performed by ASR, NLU, or other components of the same device or another device connected via network 199, such as an ASR 250, NLU 260, etc. of one or more servers 120.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   broadcasting, by a first device, a Wi-Fi discovery request including identification information corresponding to the first device;
   receiving, at a speech-controlled device connected to a Wi-Fi network-access point over a first Wi-Fi network, the Wi-Fi discovery request;
   receiving, at the speech-controlled device, a digital certificate sent by the first device;
   receiving, by the speech-controlled device, a first utterance requesting the first device be connected to the first Wi-Fi network;
   sending, from the speech-controlled device to at least one remote device, the digital certificate and first audio data corresponding to the first utterance;
   receiving, at the speech-controlled device from the at least one remote device, an instruction to send a network name and a network password corresponding to the Wi-Fi network-access point to the first device;
   sending, from the speech-controlled device to the first device, the network name and a representation of the network password; and
   establishing, by the first device using the network name and network password, a connection to the Wi-Fi network-access point.

2. The method of claim 1, further comprising:
   receiving, by the speech-controlled device and from the at least one remote device, second audio data comprising synthesized speech representing identification information corresponding to the first device and a request for confirmation to connect the first device to the first Wi-Fi network;
   outputting audio corresponding to the second audio data;
   receiving, by the speech-controlled device, a second utterance confirming the first device be connected to the first Wi-Fi network;
   sending, from the speech-controlled device to the at least one remote device, third audio data corresponding to the second utterance; and
   receiving, from the at least one remote device, an instruction to send the network name and network password to the first device.

3. The method of claim 1, further comprising:
   receiving, from the at least one remote device, a key generated based at least in part on the digital certificate; and
   determining, using the network password and the key, an encrypted network password,
   wherein the representation of the network password comprises the encrypted network password.

4. The method of claim 1, further comprising:
   determining identification information corresponding to a model name of the first device; and
   inserting the identification information into a management frame of the Wi-Fi discovery request.

5. A method comprising:
sending, using a first device, a discovery request;
receiving, at the first device, a response to the discovery request from a second device;
detecting, by the second device, an utterance corresponding to a command to connect the first device to a network-access device;
sending, from the second device, audio data representing the utterance to at least one remote device;
establishing, using the first device, a first communication connection with the second device;
sending, from the first device to the second device, first data identifying the first device;
sending, from the second device to at the least one remote device, the first data;
receiving, from the second device at the first device, a representation of login information corresponding to the network-access device; and
establishing, by the first device using the login information, a second communication connection between the first device and the network-access device.

6. The method of claim 5, wherein the first communication connection is a direct wireless connection between the first device and the second device.

7. The method of claim 5, wherein establishing the first communication connection further comprises:
establishing a first tunnel connection between the first device and the at least one remote device using a tunneled transport layer security (TTLS) protocol; and
establishing, using the first tunnel connection and the first data, a second tunnel connection between the first device and the at least one remote device using the TTLS protocol.

8. The method of claim 7, further comprising, by the second device:
receiving, from the at least one remote device, output audio data comprising identification information corresponding to the first device; and
outputting audio corresponding to the output audio data.

9. The method of claim 8, further comprising, by the second device:
after outputting the audio, detecting a second utterance comprising a confirmation to connect the first device to the network-access device;
sending second audio data representing the second utterance to the at least one remote device; and
receiving, from the at least one remote device, an instruction to send the login information to the first device.

10. The method of claim 5, wherein establishing the first communication connection further comprises:
connecting, using the first device, to an open network provided by the second device; and
sending, from the second device to the first device, captive-portal data.

11. The method of claim 5, further comprising:
receiving, from the at least one remote device, a key generated based at least in part on the first data; and
encrypting, using the key, the login information,
wherein receiving the representation of the login information comprises receiving encrypted login information.

12. The method of claim 5, further comprising:
determining identification information corresponding to a model name of the first device; and
inserting the identification information into a management frame of the discovery request.

13. A system comprising:
at least one processor; and
at least one memory including instructions that, when executed by the at least one processor, cause the system to:
sending, using a first device, a discovery request;
receive, at the first device, a response to the discovery request, the response sent from a second device;
detect, by the second device, an utterance corresponding to a command to connect the first device to a network-access device;
send, from the second device, audio data representing the utterance to at least one remote device;
establish, using the first device, a first communication connection with the second device;
send, from the first device to the second device, first data identifying the first device;
send, from the second device to at the least one remote device, the first data identifying the first device;
receive, from the second device at the first device, a representation of login information corresponding to the network-access device; and
establish, by the first device using the login information, a second communication connection between the first device and the network-access device.

14. The system of claim 13, wherein the first communication connection is a direct wireless connection between the first device and the second device.

15. The system of claim 13, wherein the instructions to establish the first communication connection further cause the system to:
establish a first tunnel connection between the first device and the at least one remote device using a tunneled transport security (TTLS) protocol; and
establish, using the first tunnel connection and the first data, a second tunnel connection between the first device and the at least one remote device using the TTLS protocol.

16. The system of claim 15, wherein the instructions, when executed by the at least one processor, further cause the system to:
receive, from the at least one remote device, output audio data comprising identification information corresponding to the first device; and
output audio corresponding to the output audio data.

17. The system of claim 16, wherein the instructions, when executed by the at least one processor, further cause the system to:
after outputting the audio, detect a second utterance comprising a confirmation to connect the first device to the network-access device;
send second audio data representing the second utterance to the at least one remote device; and
receive, from the at least one remote device, an instruction to send the login information to the first device.

18. The system of claim 16, wherein the instructions to establish the first communication connection further cause the system to:
connect, using the first device, to an open network provided by the second device; and
send, from the second device to the first device, captive-portal data.

19. The system of claim 13, wherein the instructions, when executed by the at least one processor, further cause the system to:
receive, from the at least one remote device, a key generated based at least in part on the first data; and
encrypt, using the key, the login information, wherein the instructions that configure the at least one processor to receive the representation of the login information further comprise instructions to receive encrypted login information.

20. The system of claim 13, wherein the instructions, when executed by the at least one processor, further cause the system to:
- determine identification information corresponding to a model name of the first device; and
- insert the identification information into a management frame of the discovery request.

* * * * *